US012804114B2

(12) United States Patent
Park et al.

(10) Patent No.: US 12,804,114 B2
(45) Date of Patent: Nov. 17, 2026

(54) IMAGE PROCESSOR AND STEREOSCOPIC IMAGE DISPLAY DEVICE INCLUDING THE SAME

(71) Applicant: LG Display Co., Ltd., Seoul (KR)

(72) Inventors: Myung Soo Park, Paju-si (KR); Hee Cheol Kim, Paju-si (KR); Ju Hoon Jang, Paju-si (KR); Dong Yeon Kim, Paju-si (KR); Gyu Suk Jung, Paju-si (KR); Gyo Hyun Koo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 177 days.

(21) Appl. No.: 18/792,123

(22) Filed: Aug. 1, 2024

(65) Prior Publication Data

US 2025/0280100 A1 Sep. 4, 2025

(30) Foreign Application Priority Data

Feb. 29, 2024 (KR) ........................ 10-2024-0029854

(51) Int. Cl.
*H04N 13/117* (2018.01)
*G06T 5/80* (2024.01)
(Continued)

(52) U.S. Cl.
CPC ......... *H04N 13/117* (2018.05); *H04N 13/125* (2018.05); *H04N 13/305* (2018.05);
(Continued)

(58) Field of Classification Search
CPC ................ G02B 30/27; G02B 27/0172; G02B 27/0093; G02B 27/0101; G02B 30/10; G02B 30/30; G02B 27/1066; G02B 30/26; G02B 30/00; G02B 2027/014; G02B 27/0025; G02B 27/0176; G02B 27/1073; H04N 5/2628; H04N 1/0044; H04N 13/305; H04N 2201/3269; H04N 13/31; H04N 13/383; H04N 13/302; H04N 13/366;
(Continued)

(56) References Cited

U.S. PATENT DOCUMENTS 6,278,480 B1 * 8/2001 Kurahashi ............ H04N 13/356 396/326
9,648,306 B1 * 5/2017 Cui ...................... H04N 13/327
(Continued)

FOREIGN PATENT DOCUMENTS

KR 10-2016-0128549 A 11/2016

*Primary Examiner* — Xiao M Wu
*Assistant Examiner* — Scott E Sonners
(74) *Attorney, Agent, or Firm* — Fenwick & West LLP

(57) ABSTRACT

An image processor and a stereoscopic image display device including the same are disclosed. An image processor includes an input buffer configured to receive left-eye image data and right-eye image data; a first scaler configured to scale the left-eye image data to a predetermined resolution; a second scaler configured to scale the right-eye image data to the predetermined resolution; a correction module configured to correct the scaled left-eye and right-eye image data based on a correction parameter pre-stored in an internal memory of a timing controller and user's position information sensed by a position sensing module; and an output buffer configured to store the corrected left-eye and right-eye image data.

11 Claims, 13 Drawing Sheets

(51) Int. Cl.

| | |
|---|---|
| ***H04N 13/125*** | (2018.01) |
| ***H04N 13/305*** | (2018.01) |
| ***H04N 13/327*** | (2018.01) |
| ***H04N 13/383*** | (2018.01) |
| ***H04N 13/398*** | (2018.01) |

(52) U.S. Cl.
CPC ......... *H04N 13/327* (2018.05); *H04N 13/383* (2018.05); *H04N 13/398* (2018.05); *G06T 5/80* (2024.01)

(58) Field of Classification Search
CPC ...... H04N 1/04; H04N 13/111; H04N 13/271; H04N 13/282; H04N 13/122; H04N 13/229; H04N 13/00; G06F 3/013; G06F 3/012; G06T 1/20; G06T 3/02; G06T 7/70; G06T 3/4053; G06T 2207/10024; G06T 2207/10052; G06T 15/00; G06T 3/40; G06T 2207/10012; G06T 2207/20221; G06T 11/00; G06T 7/593; G06T 2219/2016; G06T 7/55; G06T 7/596
See application file for complete search history.

(56) References Cited

U.S. PATENT DOCUMENTS

| | | | | |
|---|---|---|---|---|
| 2013/0194398 | A1* | 8/2013 | Saito .................... | H04N 13/317 348/51 |
| 2014/0022634 | A1* | 1/2014 | Takahashi .............. | G02B 30/27 359/463 |
| 2014/0091991 | A1* | 4/2014 | An ........................ | H04N 13/305 345/32 |
| 2016/0323570 | A1 | 11/2016 | Kim et al. | |
| 2024/0339060 | A1* | 10/2024 | Won ......................... | G09G 3/20 |

* cited by examiner

Specification error

Attachment position error

| | |
|---|---|
| Shift(-) |   |
| No attachment error |  |
| Shift(+) |   |

Tilting angle error

| | |
|---|---|
| Tilt(+Θ) |   |
| No tilting error |  |
| Tilt(-Θ) |   |

IMAGE PROCESSOR AND STEREOSCOPIC IMAGE DISPLAY DEVICE INCLUDING THE SAME

CROSS-REFERENCE TO RELATED APPLICATION

This application claims priority to and the benefit of Republic of Korea Patent Application No. 10-2024-0029854, filed on Feb. 29, 2024, which is incorporated herein by reference in its entirety.

BACKGROUND

1. Technical Field

The present disclosure relates to an image processor and a stereoscopic image display device including the same.

2. Discussion of Related Art

A stereoscopic image display device displays an image in three dimensions by using a perspective that appears when different image signals perceived by two eyes are synthesized. The stereoscopic image display device may be broadly divided into glasses type and non-glasses type.

In the glasses type, left and right parallax images are displayed on a direct-view display device or projector by changing the polarization direction thereof or in a time-divisional manner, and polarizing glasses or liquid crystal shutter glasses are used to realize a stereoscopic image. In the non-glasses type, optical components such as a parallax barrier and a lenticular lens for separating the optical axes of the left and right parallax images are installed in front of or behind a display screen to realize a stereoscopic image.

In particular, the stereoscopic image display device using the non-glasses type has an advantage of allowing an observer to look directly at the screen and view the stereoscopic image without additional glasses.

SUMMARY

However, the optical components are attached to the display screen by a mechanical method using an attachment equipment, and when attached by a mechanical method, the optical components may be attached at a position that slightly deviates from a preset position due to a process error, a process margin, or the like. This attachment error may cause the left and right eye images to be separated and not accurately reach the user's left and right eyes.

The present disclosure is directed to solving all the above-described problems.

The present disclosure provides an image processor and a stereoscopic image display device including the same.

It should be noted that objectives of the present disclosure are not limited to the above-described objectives, and other objectives of the present disclosure will be apparent to those skilled in the art from the following descriptions.

An image processor according to embodiments of the present disclosure may include an input buffer configured to receive left-eye image data and right-eye image data; a first scaler configured to scale the left-eye image data to a predetermined resolution; a second scaler configured to scale the right-eye image data to the predetermined resolution; a correction module (e.g., a correction circuit) configured to correct the scaled left-eye and right-eye image data based on a correction parameter pre-stored in an internal memory of a timing controller and user's position information sensed by a position sensing module; and an output buffer configured to store the corrected left-eye and right-eye image data.

A stereoscopic image display device according to embodiments of the present disclosure may include a display panel in which a plurality of data lines, a plurality of gate lines, and a plurality of pixels are arranged; a data driver configured to apply a data voltage of image data to the plurality of data lines; a gate driver configured to apply a gate signal to the plurality of gate lines; a timing controller configured to transmit the image data to the data driver and to control operation timings of the data driver and the gate driver; an optical module attached to the front surface of the display panel; and an image processor configured to correct the image data based on a correction parameter pre-stored in an internal memory of the timing controller and user's position information sensed by a position sensing module, and to transmit the corrected image data to the timing controller.

According to the present disclosure, a plurality of lenticular lenses of the optical module are disposed parallel to the second axis direction, and a correction parameter for misalignment is measured using marks formed on the display panel and the optical module, and image data is corrected based on the measured correction parameter, thereby reducing crosstalk caused by misalignment and improving deterioration of image quality.

According to the present disclosure, since the image data is corrected based on the correction parameter for misalignment, additional correction processes may be minimized or at least reduced, thereby enabling process optimization.

The effects of the present specification are not limited to the above-mentioned effects, and other effects that are not mentioned will be apparently understood by those skilled in the art from the following description and the appended claims.

BRIEF DESCRIPTION OF THE DRAWINGS

The above and other objectives, features, and advantages of the present disclosure will become more apparent to those of ordinary skill in the art by describing exemplary embodiments thereof in detail with reference to the attached drawings.

DETAILED DESCRIPTION

Figure 1:
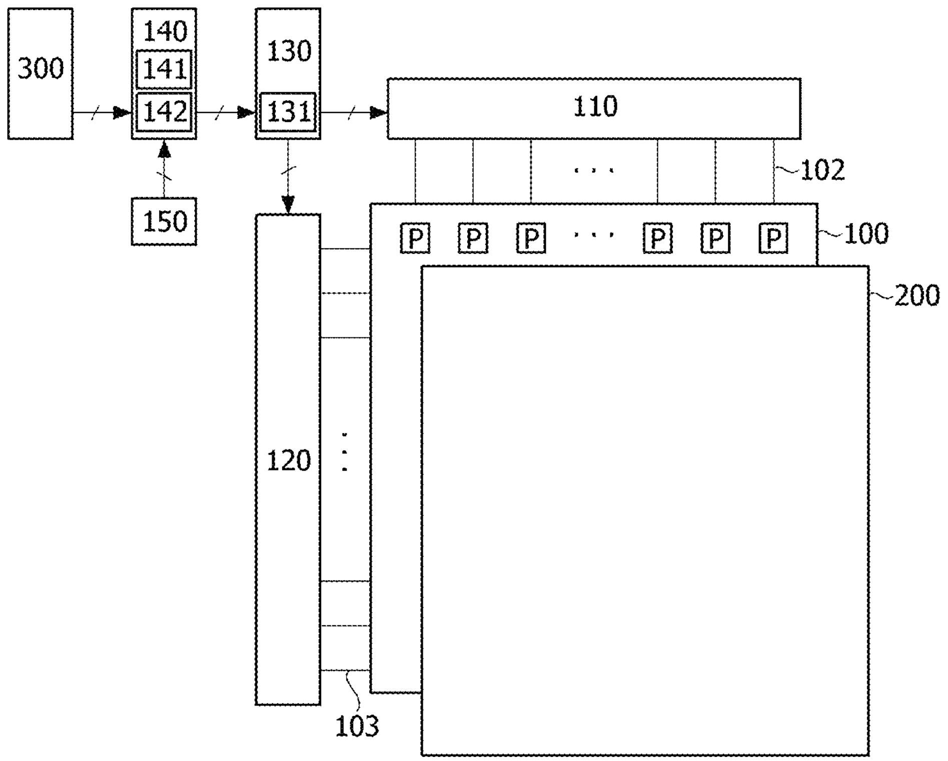
FIG. 1 is a block diagram illustrating a stereoscopic image display device according to an embodiment of the present disclosure.

Advantages and features of the present specification and methods of achieving them will become apparent with reference to preferable embodiments, which are described in detail, in conjunction with the accompanying drawings. However, the present specification is not limited to the embodiments to be described below and may be implemented in different forms, the embodiments are only provided to completely disclose the present disclosure and completely convey the scope of the present disclosure to those skilled in the art, and the present specification is defined by the disclosed claims.

Since the shapes, sizes, proportions, angles, numbers, and the like disclosed in the drawings for describing the embodiments of the present disclosure are only exemplary, the present disclosure is not limited to the illustrated items. The same reference numerals indicate the same components throughout the specification. Further, in describing the present disclosure, when it is determined that a detailed description of related known technology may unnecessarily obscure the gist of the present disclosure, the detailed description thereof will be omitted.

When 'including,' 'having,' 'comprising,' and the like mentioned in the present specification are used, other parts may be added unless 'only' is used. A case in which a component is expressed in a singular form includes a plural form unless explicitly stated otherwise.

In interpreting the components, it should be understood that an error range is included even when there is no separate explicit description.

In the case of a description of a positional relationship, for example, when the positional relationship of two parts is described as 'on,' 'at an upper portion,' 'at a lower portion,' 'next to, and the like, one or more other parts may be located between the two parts unless 'immediately' or 'directly' is used.

Although first, second, and the like are used to describe various components, these components are not limited by these terms. These terms are only used to distinguish one component from another. Accordingly, a first component, which is mentioned, below may also be a second component within the technical spirit of the present disclosure.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the case of the n-channel transistor, a gate-on voltage may be a gate high voltage, and a gate-off voltage may be a gate low voltage. In the case of the p-channel transistor, a gate-on voltage may be a gate low voltage, and a gate-off voltage may be a gate high voltage.

Figure 2:
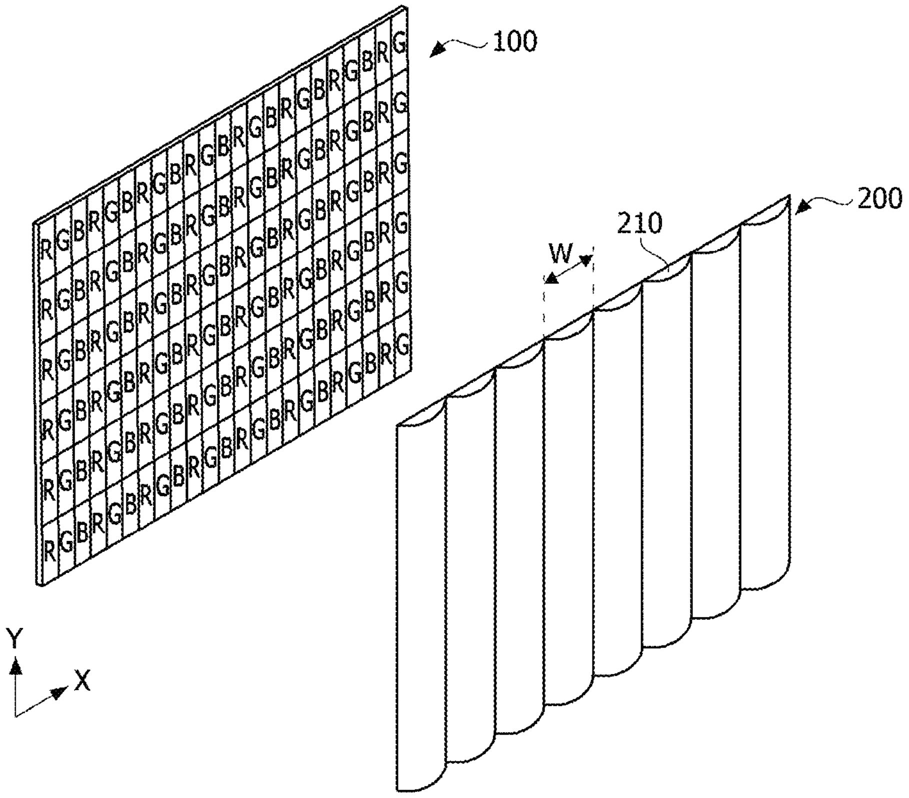
FIG. 2 is a perspective view illustrating the arrangement of a display panel and an optical module shown in FIG. 1 according to an embodiment of the present disclosure.
Figure 3A:
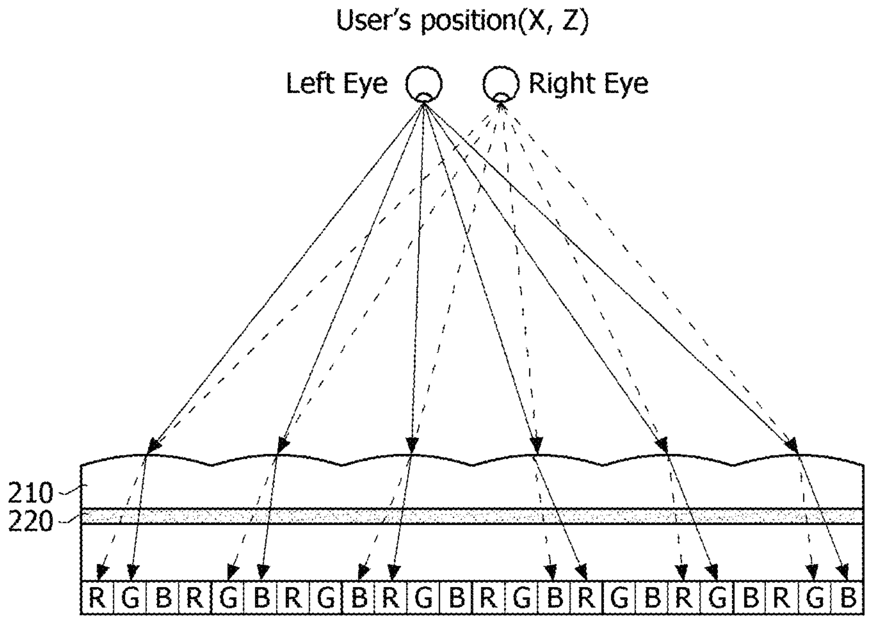
FIGS. 3A and 3B are diagrams illustrating a principle of implementing a stereoscopic image of a stereoscopic image display device according to an embodiment of the present disclosure.
Figure 3B:
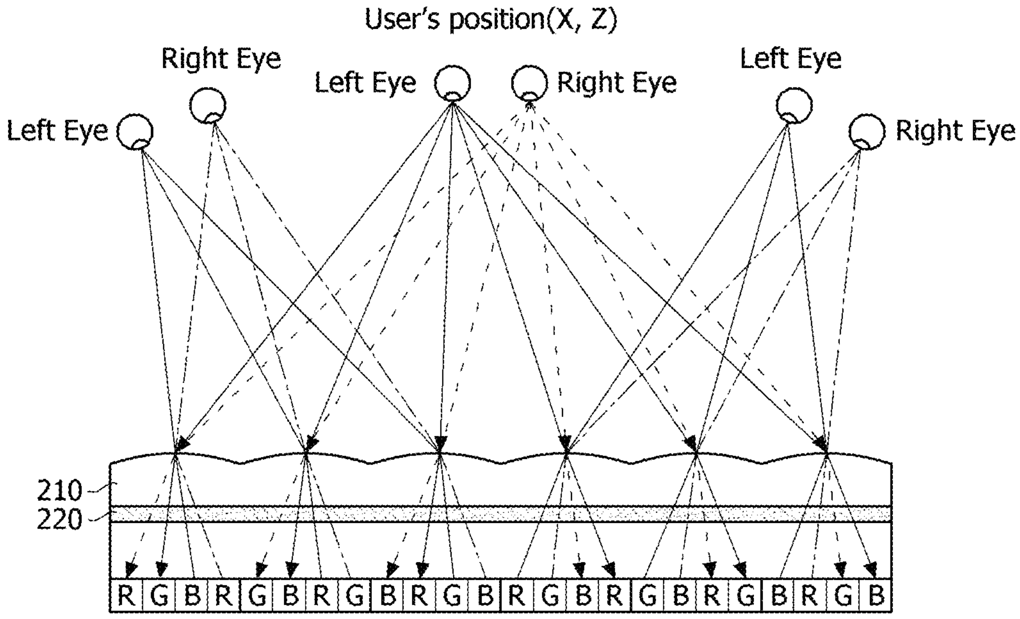

FIG. 1 is a block diagram illustrating a stereoscopic image display device according to an embodiment of the present disclosure, FIG. 2 is a perspective view illustrating the arrangement of a display panel and an optical module shown in FIG. 1, and FIGS. 3A and 3B are diagrams illustrating a principle of implementing a stereoscopic image of a stereoscopic image display device.

Referring to FIG. 1, a stereoscopic image display device according to one embodiment of the present disclosure may include a display panel 100, a data driver 110, a gate driver 120, a timing controller 130, an image processor 140 (e.g., an image processor circuit), a position sensing module 150, an optical module 200, and a host system 300.

The display panel 100 may be a panel with a rectangular structure having a length in an X-axis direction, a width in a Y-axis direction, and a thickness in a Z-axis direction, but is not limited thereto. For example, the display panel 100 may be a deformed panel having at least a portion of a curved or elliptical shape. The display panel 100 may be implemented as various display panels such as a liquid crystal display (LCD) panel and an organic light emitting diode (OLED) panel, but is not limited thereto.

A display area of the display panel 100 includes a pixel array displaying an input image. The pixel array includes a plurality of data lines 102, a plurality of gate lines 103 intersecting the data lines 102, and pixels P arranged in a matrix form. The display panel 100 may further include power lines commonly connected to the pixels P. The power lines may be commonly connected to pixel circuits to supply a voltage required for driving the pixels P to the pixels.

Each of the pixels P may be divided into a red sub-pixel, a green sub-pixel, and a blue sub-pixel for color implementation. Each of the pixels P may further include a white sub-pixel.

The display panel 100 may be implemented as a non-transmissive display panel or a transmissive display panel. The transmissive display panel may be applied to a transparent display device in which an image is displayed on a screen and a real object in a background is visible. The display panel 100 may be manufactured as a flexible display panel that can be flexibly bent.

The data driver 110 receives pixel data of the input image transmitted as a digital signal from the timing controller 130 and outputs a data voltage. The data driver 110 may receive gamma reference voltages to generate gamma compensation voltages for each grayscale through a voltage divider circuit. The gamma compensation voltages for each grayscale are supplied to a digital to analog converter (DAC) disposed in each of the channels of the data driver 110.

The data driver 110 samples and latches digital data received from the timing controller 130, and then inputs the digital data to the DAC. Here, the digital data includes the pixel data of the input image. The DAC converts the pixel data into a gamma compensation voltage to output the data voltage of the pixel data.

The gate driver 120 sequentially outputs the pulses of gate signals to the gate lines 103 under the control of the timing controller 130. The gate driver 120 may shift the pulses of the gate signals using a shift register to sequentially supply the signals to the gate lines 103. The gate driver 120 may supply the gate pulses to both sides of the gate lines 103 in a double feeding manner. In another embodiment, the gate driver 120 may supply the gate signals to the gate lines 103 in a single feeding manner.

The timing controller 130 receives digital video data of the input image and a timing signal synchronized with the data from the host system 300. The timing signal may include a vertical synchronization signal Vsync, a horizontal synchronization signal Hsync, a data enable signal DE, and the like. The vertical synchronization signal Vsync and the horizontal synchronization signal Hsync may be omitted since a vertical period and a horizontal period may be known by counting the data enable signal DE. The horizontal synchronization signal Hsync and the data enable signal DE have a cycle of one horizontal period 1H.

The timing controller 130 may control a display panel driving circuit by generating a data timing control signal for controlling the operation timing of the data driver 110 and a gate timing control signal for controlling the operation timing of the gate driver 120 based on the timing signal Vsync, Hsync, and DE received from the host system 300. The timing controller 130 may synchronize the data driver 110 with the gate driver 120 by controlling the operation timing of the display panel driving circuit.

The timing controller 130 may include an internal memory 131. The internal memory 131 may be implemented as an electrically erasable programmable read-only memory (EEPROM), but is not necessarily limited thereto. The internal memory 131 may store a predetermined correction parameter. The correction parameter may include at least one measurement value, e.g., an attachment position (shift) error and a tilting angle error of the optical module or an error of a size, such as a pitch, of the optical module itself, obtained from a measuring device that measures the attachment state of the optical module to the display panel.

The host system 300 may include a main board of any one of a television (TV) system, a set-top box, a navigation system, a personal computer (PC), a vehicle system, a mobile terminal, and a wearable terminal. The host system 300 may scale an image signal from a video source to match the resolution of the display panel 100 and transmit it to the timing controller 130 together with the timing signal.

The optical module 200 may be attached to the front surface of the display panel 100 in the form of a film. The optical module 200 may separate light irradiated from the display panel into a left-eye image and a right-eye image and output the separated light.

Referring to FIG. 2, the optical module 200 may be disposed on the front surface of the display panel 100 according to one embodiment of the present disclosure. The optical module 200 may include a plurality of lenticular lenses 210 having a predetermined width W. The plurality of lenticular lenses 210 may be elongated in a second axis direction (e.g., the Y axis direction) and disposed side by side.

That is, the plurality of lenticular lenses 210 according to an embodiment may be disposed parallel to the second axis direction, rather than being tilted at a predetermined angle with respect to the second axis direction.

Referring to FIGS. 3A and 3B, the optical module 200 is disposed on the front surface of the display panel 100, and an interval between left-eye image data and right-eye image data is set to allow a user to perceive a binocular parallax according to one embodiment of the present disclosure. In other words, by varying the luminance distribution of an image seen by a viewer depending on the viewer's position, different images are seen by the left and right eyes, thereby enabling the viewer to perceive a stereoscopic image.

In the configuration of FIG. 3A, the user may observe a stereoscopic image at any one viewing position with respect to the lenticular lens, and in the configuration of FIG. 3B, the user may observe different stereoscopic images at two or more viewing positions. Although the configuration of FIG. 3B uses the same lenticular lens as in FIG. 3A, the pixels visible from different viewing positions may vary.

In this case, the optical module 200 may include the plurality of lenticular lenses 210 and an adhesive member 220 formed on the bottom surface of the plurality of lenticular lenses 210. The optical module 200 may be attached and fixed to an upper glass substrate of the display panel by the adhesive member 220 formed on the bottom surface.

The image processor 140 may receive stereoscopic image data from the host system 300 and provide the received stereoscopic image data to the timing controller 130. In this case, the image processor 140 may receive the pre-stored correction parameter from the timing controller 130, correct the stereoscopic image data using the received correction parameter, and provide the corrected stereoscopic image data to the timing controller 130.

The image processor 140 may be disposed in a physically separate form from the timing controller 130, but is not limited thereto and may be disposed within the timing controller 130.

For example, in an embodiment, the timing controller 130 may be disposed on a control PCB (CPCB), and the image processor 140 may be disposed on a PCB for stereoscopic image processing that is different from the CPCB.

The position sensing module 150 may sense the user's position information and transmit the sensed position information to the image processor 140. The position sensing module 150 may include a camera.

Figure 4A:
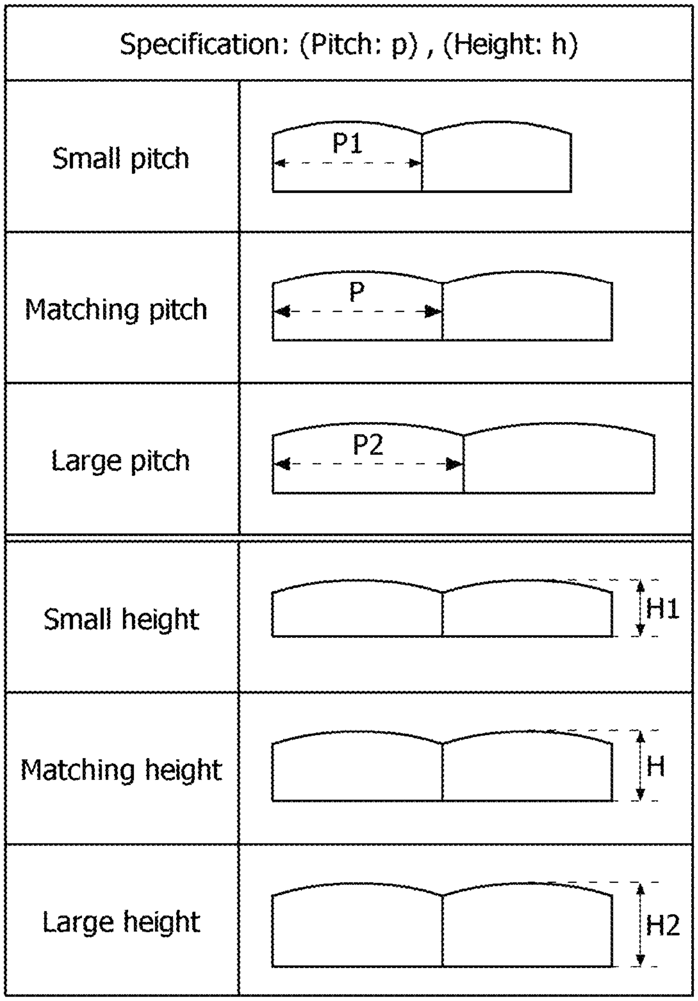
FIGS. 4A to 4C are diagrams illustrating misalignment between a display panel and an optical module according to an embodiment of the present disclosure.
Figure 4B:
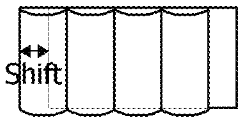
Figure 4B:
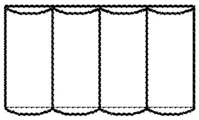
Figure 4B:
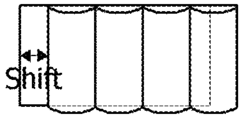
Figure 4C:
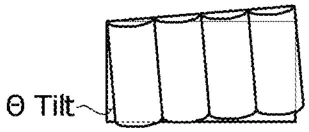
Figure 4C:
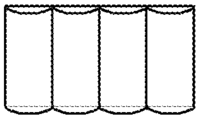
Figure 4C:
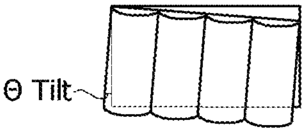

FIGS. 4A to 4C are diagrams illustrating misalignment between a display panel and an optical module according to an embodiment of the present disclosure.

Referring to FIG. 4A, the lenticular lens used in the optical module may have different specifications depending on the product model, and cases are shown in which the lenticular lens, having a small or large pitch, which is a hogel size, depending on the specifications, is attached. The specification of such a lenticular lens may include the pitch or height of the lenticular lens as a factor that may affect the user's viewing position, but is not necessarily limited thereto.

Here, the pitch may decrease in the order of P2>P>P1, and the height may decrease in the order of H2>H>H1.

Referring to FIG. 4B, the attachment position of the lenticular lens used in the optical module may vary, and cases are shown in which the lenticular lens is attached skewed to the left or skewed to the right. In addition, the lenticular lenses may be attached not only skewed to the left or right, but also skewed to the top or bottom. That is, the attachment position error of the lenticular lens may indicate an error in which the lenticular lens is attached skewed to one side.

Referring to FIG. 4C, the tilting angle of the lenticular lens used in the optical module may vary, and cases are shown in which the lenticular lens is attached tilted to the left or tilted to the right.

In an embodiment, the specification error of the lenticular lens, the attachment position error of the lenticular lens, and the tilting angle error of the lenticular lens are described as one example, but the present disclosure is not necessarily limited thereto.

Figure 5:
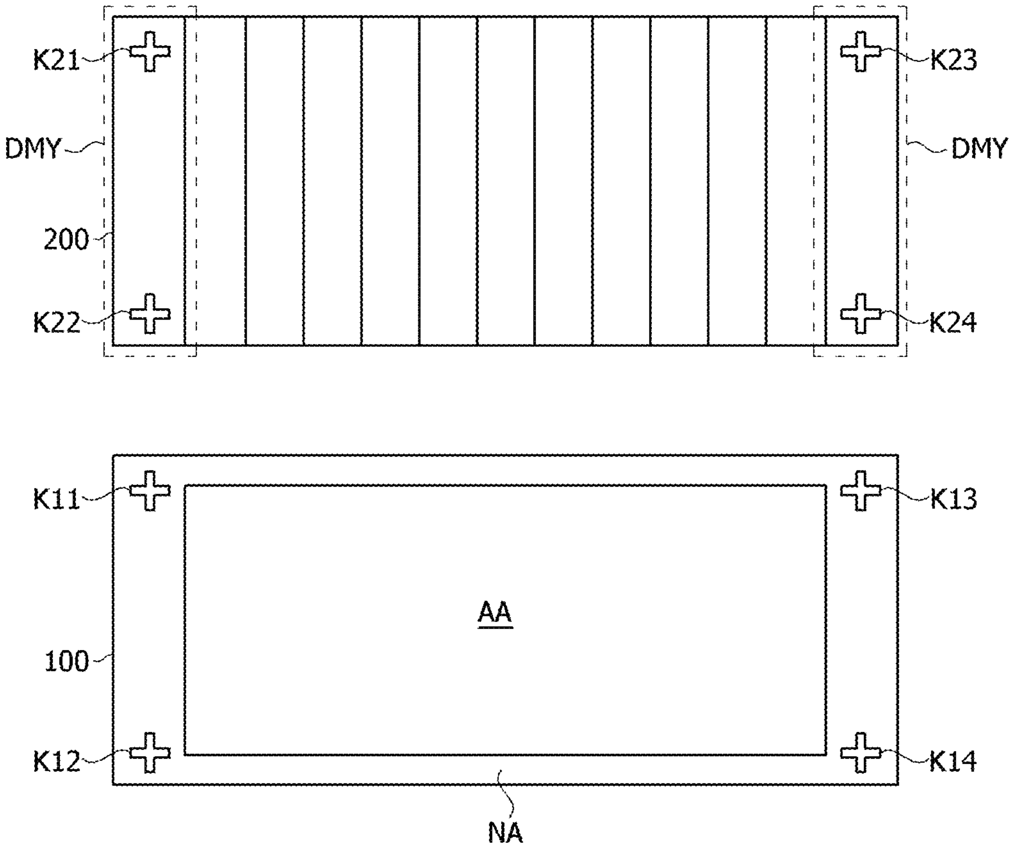
FIG. 5 is a diagram illustrating a principle of measuring misalignment between a display panel and an optical module according to an embodiment of the present disclosure.

FIG. 5 is a diagram illustrating a principle of measuring misalignment between a display panel and an optical module according to an embodiment of the present disclosure.

Referring to FIG. 5, in order to measure misalignment between the display panel and the optical module, a plurality of alignment marks may be displayed on the display panel and the optical module. Specifically, the plurality of alignment marks may be formed in a non-display area of the display panel and a dummy area of the optical module.

Four first alignment marks K11 to K14 may be formed in a corner region of the non-display area of the display panel, and four second alignment marks K21 to K24 may be formed in a corner region of the dummy area of the optical module.

The first alignment marks K11 to K14 and the second alignment marks K21 to K24 may be formed at positions corresponding to each other. The measuring device may measure the misalignment based on whether the first alignment marks K11 to K14 and the second alignment marks K21 to K24 match. Through this measurement, the attachment position error and the tilting angle error of the lenticular lens may be measured.

When the first alignment marks K11 to K14 and the second alignment marks K21 to K24 do not accurately match, the misalignment between the display panel and the optical module occurs, causing crosstalk in the display device.

Here, the shape of the first alignment marks K11 to K14 and the second alignment marks K21 to K24 shown in the drawing is only an example, and may be formed in various shapes without being limited thereto.

In this case, it may be recognized that the lenticular lens has been attached skewed due to a different specification of the lenticular lens rather than being attached skewed to one side due to the attachment position error, and to this end, in addition to the plurality of alignment marks in the non-display area of the display panel and the dummy area of the optical module, a specification mark indicating the specification of the lenticular lens may be further formed near the alignment marks.

The specification mark may be formed in at least one of the non-display area of the display panel and the dummy area of the optical module. For example, the specification mark may be formed only in the dummy area of the optical module.

The measuring device may recognize the specification mark displayed on the display panel and the optical module, and through the recognized specification mark, may verify whether the lenticular lens with a required specification has actually been used.

In this way, in an embodiment, the plurality of lenticular lenses of the optical module may be disposed parallel to the second axis direction, precise alignment lamination may be possible using the marks formed on the display panel and the optical module, quality degradation due to misalignment may be improved, and additional correction processes may be minimized or at least reduced, thereby enabling process optimization.

Figure 6:
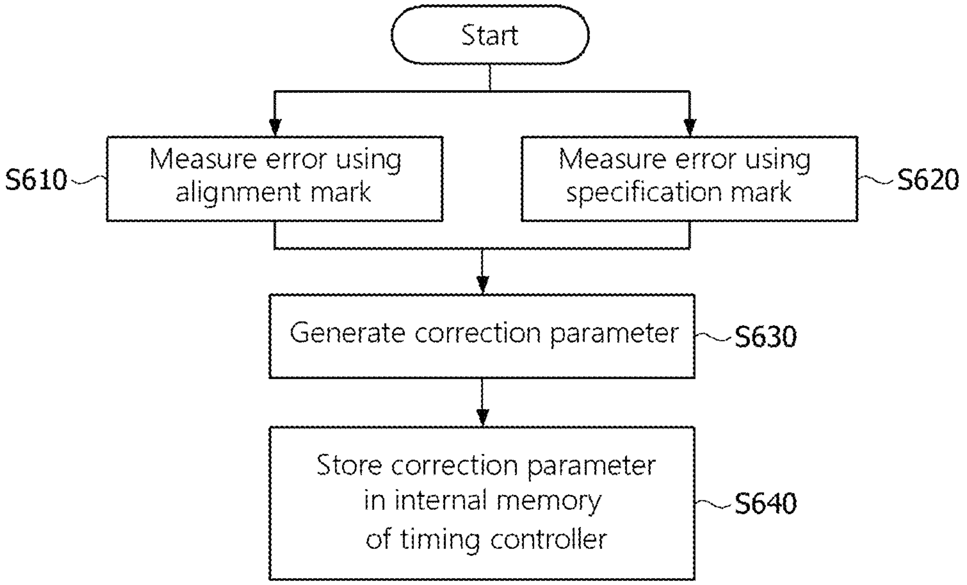
FIG. 6 is a diagram illustrating a method of measuring a correction parameter according to an embodiment of the present disclosure.

FIG. 6 is a diagram illustrating a method of measuring a correction parameter according to an embodiment of the present disclosure.

Referring to FIG. 6, during the process of attaching the optical module to the front surface of the display panel, the measuring device may measure the attachment position error of the lenticular lens and the tilting angle error of the lenticular lens by using the alignment mark formed in the non-display area of the display panel and the dummy area of the optical module (S610). Here, as the measuring device, for example, a camera and the like may be used.

In addition, the measuring device may measure the specification error of the lenticular lens by using the specification mark formed in the dummy area of the optical module (S620). In this case, the specification error is described as being measured by the measuring device as an example, but it is not necessarily limited thereto and may be directly inputted by a person performing the measurement.

Next, the measuring device may generate the correction parameter including the measured attachment position error of the lenticular lens, the tilting angle error of the lenticular lens, and the specification error of the lenticular lens (S630).

Next, the measuring device may store the generated correction parameter in the internal memory of the timing controller (S640). The stored correction parameter may be used for the correction of the image data.

Figure 7:
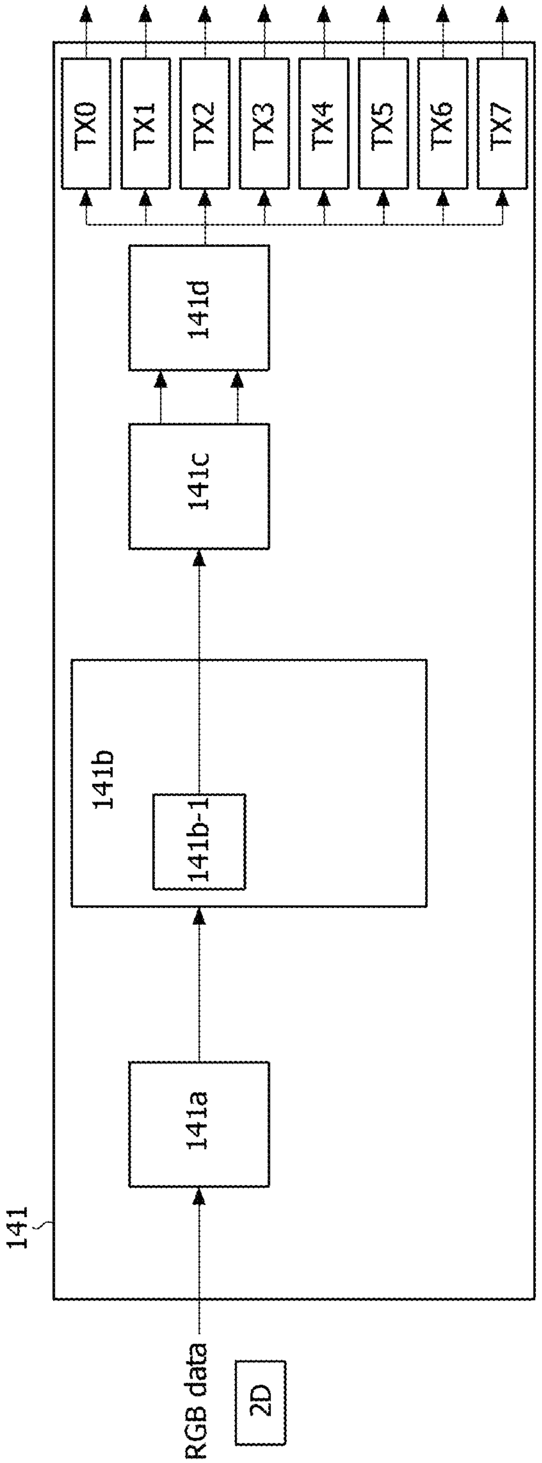
FIG. 7 is a diagram illustrating a detailed configuration of a first image processor shown in FIG. 1 according to an embodiment of the present disclosure.
Figure 8:
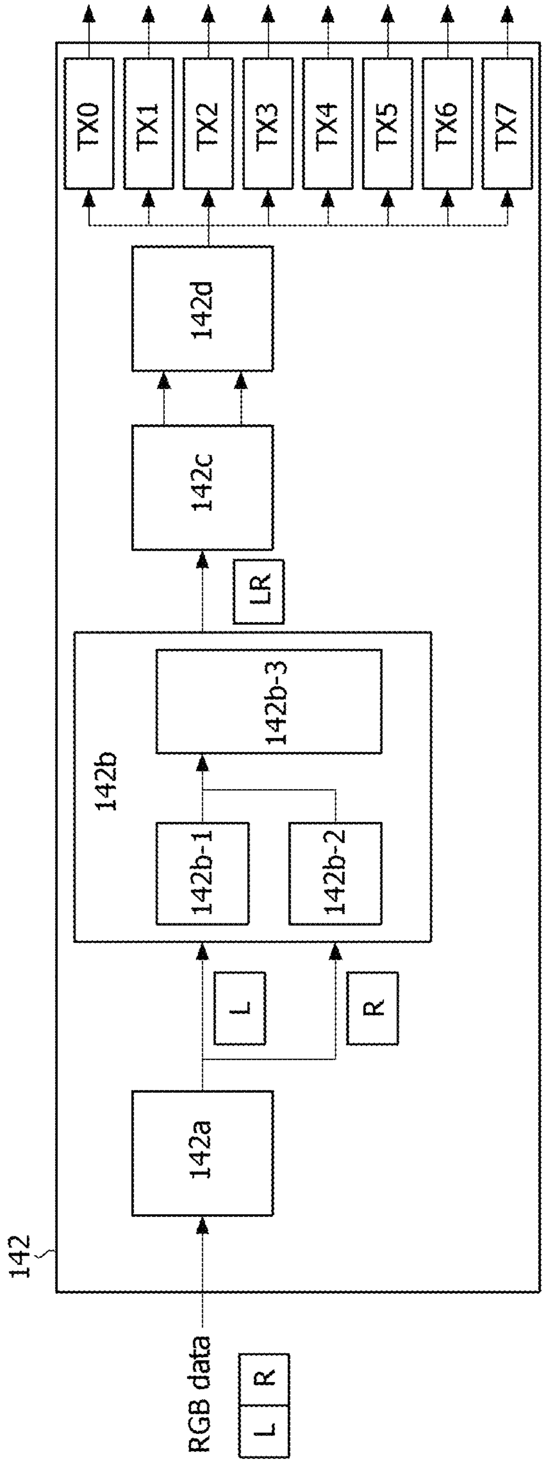
FIG. 8 is a diagram illustrating a detailed configuration of a second image processor shown in FIG. 1 according to an embodiment of the present disclosure.

FIG. 7 is a diagram illustrating a detailed configuration of a first image processor shown in FIG. 1 according to an embodiment of the present disclosure, and FIG. 8 is a diagram illustrating a detailed configuration of a second image processor shown in FIG. 1 according to an embodiment of the present disclosure.

Referring to FIG. 7, a first image processor 141 according to an embodiment may include a first input buffer 141*a*, a first processor 141*b*, a first output buffer 141*c*, and a first output module 141*d*.

The first input buffer 141*a* (e.g., a circuit) may receive and store 2D RGB image data from the host system. The first input buffer 141*a* may store and output the RGB image data in a first-in, first-out (FIFO) manner.

The first processor 141*b* may include a scaler 141*b*-1 (e.g., a circuit). The scaler 141*b*-1 may scale the RGB image data outputted from the first input buffer 141*a* to a resolution that can be displayed on the display device and output it.

The first output buffer 141*c* (e.g., a circuit) may receive and store the RGB image data outputted from the first processor 141*b*. Similarly to the first input buffer 141*a*, the first output buffer 141*c* may store and output the RGB image data in a first-in, first-out (FIFO) manner.

The output module 141*d* (e.g., a circuit) may convert the RGB image data outputted from the first output buffer 141*c* according to a communication protocol and output it to a plurality of predetermined transmission ports TX0 to TX7.

Referring to FIG. 8, a second image processor 142 according to an embodiment may include a second input buffer 142*a*, a second processor 142*b*, a second output buffer 142*c*, and a second output module 142*d*.

The second input buffer 142*a* may receive and store RGB image data for the left eye and the right eye from the host system. The second input buffer 142*a* may store and output the RGB image data in a first-in, first-out (FIFO) manner.

The second processor 142*b* may include a first scaler 142*b*-1, a second scaler 142*b*-2, and a correction module 142*b*-3. The first scaler 142*b*-1 may scale the left-eye RGB image data outputted from the second input buffer 142*a* to a resolution that can be displayed on the display device and output it. The second scaler 142*b*-2 may scale the right-eye RGB image data outputted from the second input buffer 142*a* to a resolution that can be displayed on the display device and output it.

The correction module 142*b*-3 may read the correction parameter stored in the timing controller and correct the left-eye and right-eye RGB image data based on the read correction parameter and the user's position information sensed by the position sensing module.

For example, the correction module 142*b*-3 may perform a primary correction based on the read correction parameter, and may perform a secondary correction on the left-eye and right-eye RGB image data based on the sensed user's position information.

The second output buffer 142*c* may receive and store the RGB image data outputted from the second processor 142*b*. Similarly to the second input buffer 142*a*, the second output buffer 142*c* may store and output the RGB image data in a first-in, first-out (FIFO) manner.

The second output module 142*d* may convert the RGB image data outputted from the second output buffer 142*c* according to a communication protocol and output it to the plurality of predetermined transmission ports TX0 to TX7.

Figure 9:
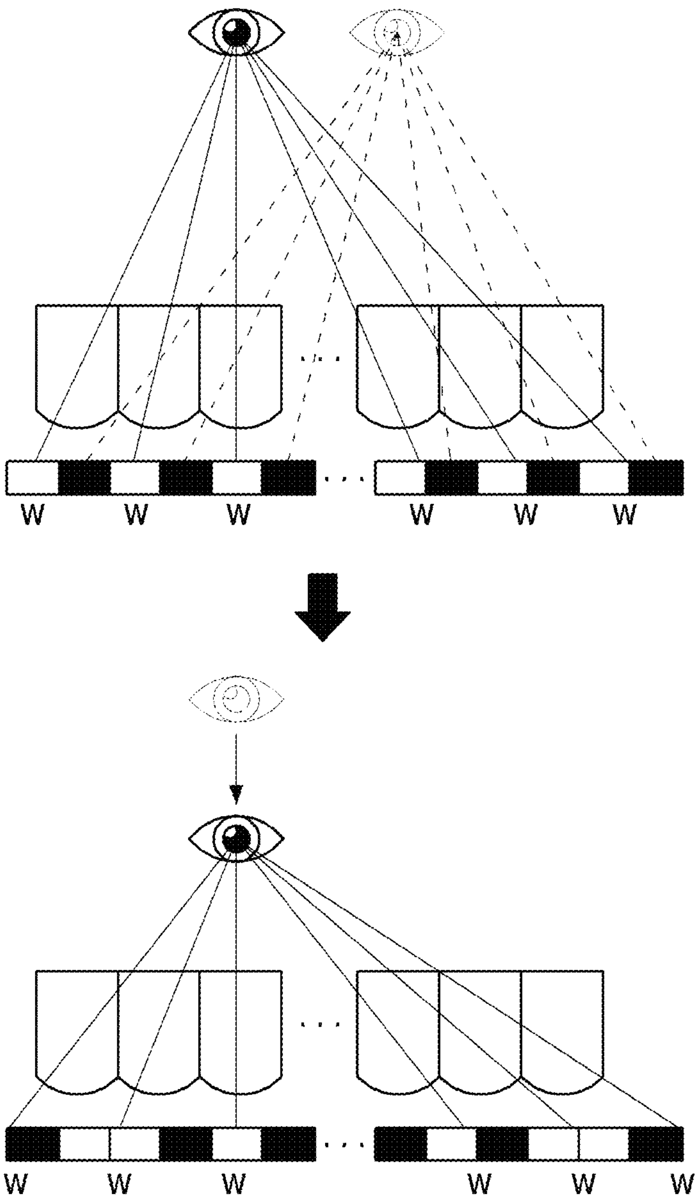
FIG. 9 is a diagram illustrating a correction principle of stereoscopic image data according to a viewing position according to an embodiment of the present disclosure.

FIG. 9 is a diagram illustrating a correction principle of stereoscopic image data according to a viewing position according to an embodiment of the present disclosure.

Referring to FIG. 9, the image processor according to an embodiment may correct the image data based on the user's position information. For example, the image processor may correct the image data when a viewing position is closer than a reference distance based on the user's position information.

The pixels viewable by the user's left-eye at the reference distance may be white sub-pixels W, and even when the viewing position is closer than the reference distance, the image data may be corrected so that the same white sub-pixels are viewable by the user's left-eye.

Figure 10:
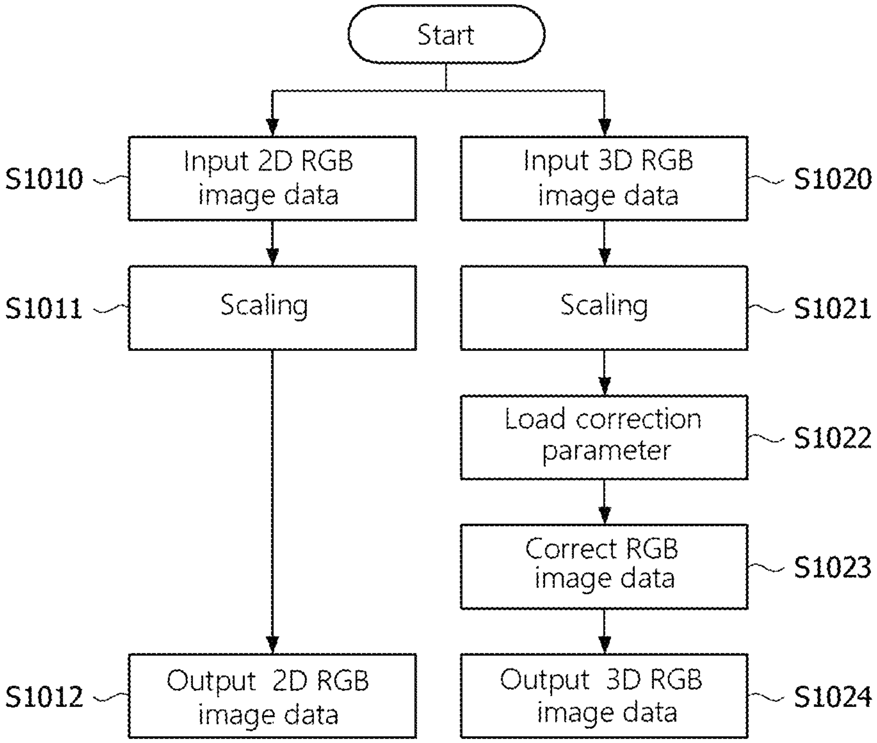
FIG. 10 is a diagram illustrating a stereoscopic image display method according to an embodiment of the present disclosure.

FIG. 10 is a diagram illustrating a stereoscopic image display method according to an embodiment of the present disclosure.

Referring to FIG. 10, when 2D RGB image data is inputted (S1010), the image processor according to an embodiment of the present disclosure may scale the inputted RGB image data to a resolution that can be displayed on the display device (S1011).

Next, the image processor may output the scaled RGB image data to the timing controller (S1012).

On the other hand, when 3D RGB image data for the left eye and the right eye are inputted (S1020), the image processor may scale each of the inputted left-eye and right-eye RGB image data to a resolution that can be displayed on the display device (S1021).

Next, the image processor may read the pre-stored correction parameter from the timing controller (S1022), and correct the left-eye and right-eye RGB image data based on the read correction parameter and the user's position information sensed by the position sensing module (S1023).

In this case, correcting the RGB image data is to correct the RGB image data applied to each pixel based on the misalignment between the display panel and the optical module and the user's viewing position.

Next, the image processor may output the corrected RGB image data to the timing controller (S1024).

Figure 11A:
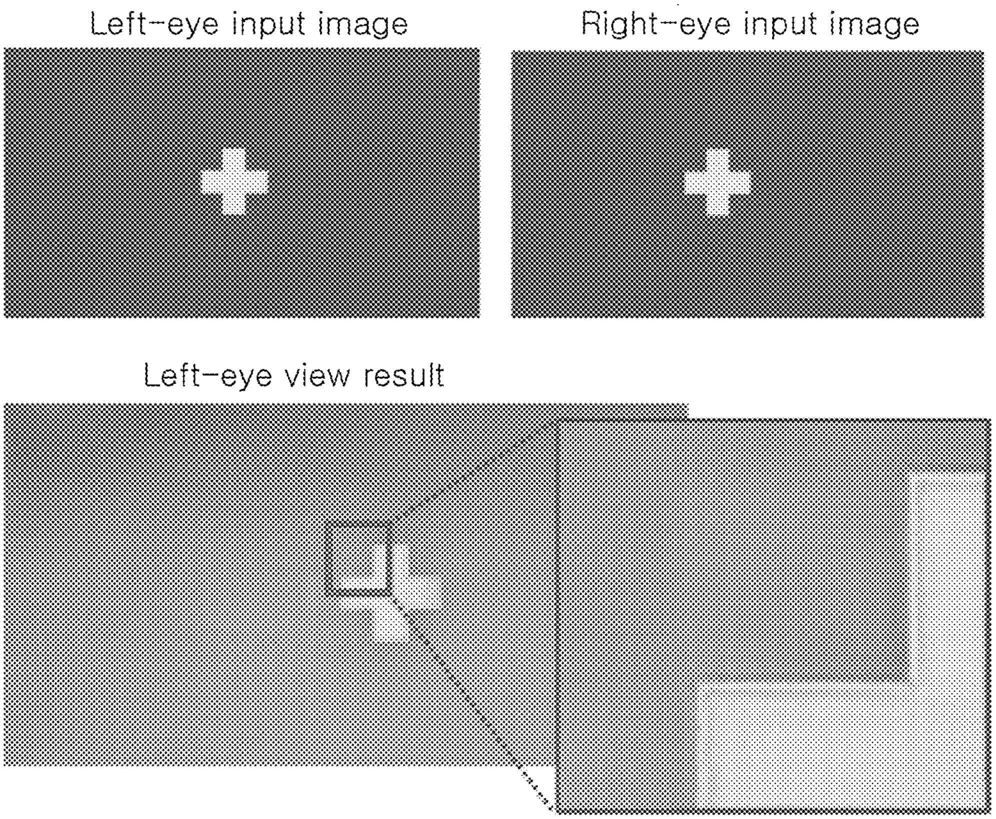
FIGS. 11A and 11B are diagrams for comparing the performance of a comparative example according to an embodiment of the present disclosure.
Figure 11B:
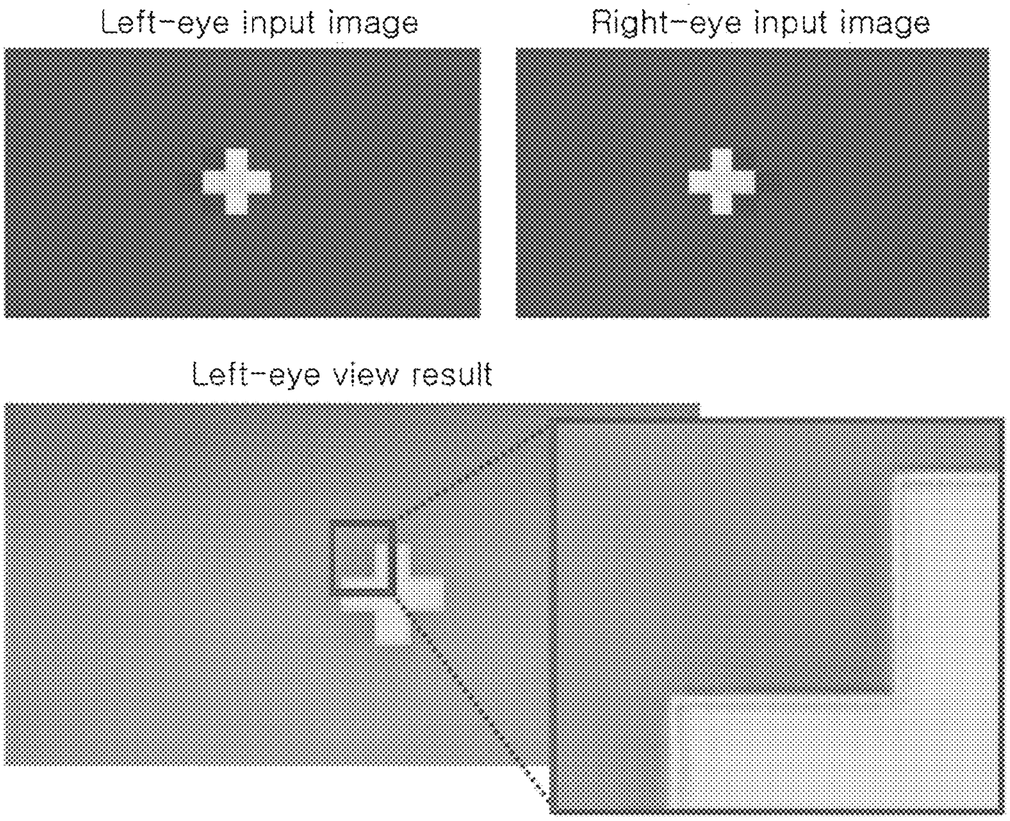

FIGS. 11A and 11B are diagrams for comparing the performance of a comparative example according to one or more embodiments of the present disclosure.

Referring to FIG. 11A, in a comparative example in which the misalignment between the display panel and the optical module is not corrected, crosstalk occurs in the image data viewed by the user's left-eye.

This is because a portion of the right-eye image data overlaps with the left-eye image data, and a portion of the left-eye image data overlaps with the right-eye image data due to the misalignment between the display panel and the optical module.

Referring to FIG. 11B, in an embodiment in which the misalignment between the display panel and the optical module is corrected, crosstalk is significantly reduced in the image data viewed by the user's left-eye.

This is because the image overlapping phenomenon is eliminated by correcting the left-eye and right-eye image data based on the correction parameter measured in advance according to the misalignment between the display panel and the optical module.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. An image processor comprising:

an input buffer configured to receive left-eye image data and right-eye image data;

a first scaler configured to scale the left-eye image data to a predetermined resolution;

a second scaler configured to scale the right-eye image data to the predetermined resolution;

a correction module configured to correct the scaled left-eye image data and the scaled right-eye image data based on a correction parameter pre-stored in an internal memory of a timing controller and user's position information sensed by a position sensing module; and an output buffer configured to store the corrected left-eye image data and the corrected right-eye image data, wherein the correction parameter includes a specification error of an optical module, an attachment position error of the optical module, and a tilting angle error of the optical module, wherein the attachment position error and the tilting angle error are determined based on first alignment marks formed in the display panel and second alignment marks formed in the optical module to correspond to the first alignment marks, the specification error is determined based on a specification mark formed in the optical module and indicating a specification of the optical module, and wherein the correction module performs a primary correction on the scaled left-eye image data and the scaled right-eye image data based on the correction parameter, and performs a secondary correction on the primary-corrected left-eye image data and the primary-corrected right-eye image data based on the user's position information.

2. A stereoscopic image display device comprising:

a display panel comprising a plurality of data lines, a plurality of gate lines, and a plurality of pixels;

a data driver configured to apply a data voltage of image data to the plurality of data lines;

a gate driver configured to apply a gate signal to the plurality of gate lines;

a timing controller configured to transmit the image data to the data driver, and to control operation timings of the data driver and the gate driver;

an optical module attached to a front surface of the display panel; and an image processor configured to correct the image data based on a correction parameter pre-stored in an internal memory of the timing controller and user's position information sensed by a position sensing module, and transmit the corrected image data to the timing controller, wherein the correction parameter includes a specification error of an optical module, an attachment position error of the optical module, and a tilting angle error of the optical module, wherein the attachment position error and the tilting angle error are determined based on first alignment marks formed in the display panel and second alignment marks formed in the optical module to correspond to the first alignment marks, the specification error is determined based on a specification mark formed in the optical module and indicating a specification of the optical module, and wherein the image processor performs a primary correction on the image data based on the correction parameter, and performs a secondary correction on the primary-corrected image data based on the user's position information.

3. The stereoscopic image display device of claim 2, wherein the optical module includes a plurality of lenticular lenses having a predetermined width, wherein the plurality of lenticular lenses are arranged side by side in a same direction as a direction of the plurality of data lines.

4. The stereoscopic image display device of claim 3, wherein the optical module further includes an adhesive member on bottom surfaces of the plurality of lenticular lenses.

5. The stereoscopic image display device of claim 3, wherein a dummy area that lacks any lenticular lenses is on both sides of the optical module, a plurality of first alignment marks are in a non-display area of the display panel, and a plurality of second alignment marks corresponding to the plurality of first alignment marks are in the dummy area of the optical module.

6. The stereoscopic image display device of claim 5, wherein the correction parameter is an error indicating a degree of alignment between a first alignment mark from the plurality of first alignment marks and a second alignment mark from the plurality of second alignment marks, measured by a measuring device when the optical module is attached to the front surface of the display panel.

7. The stereoscopic image display device of claim 5, wherein a specification mark that indicates a specification of the optical module is in the dummy area of the optical module.

8. The stereoscopic image display device of claim 2, wherein the image processor includes:

a first image processor configured to scale 2D image data to a first resolution responsive to receiving the 2D image data; and a second image processor configured to scale left-eye image data and right-eye image data to a second resolution responsive to receiving the left-eye image data and the right-eye image data.

9. The stereoscopic image display device of claim 8, wherein the first image processor includes:

an input buffer configured to receive the 2D image data;

a scaler configured to scale the 2D image data to the first resolution; and an output buffer configured to store the scaled 2D image data.

10. The stereoscopic image display device of claim 8, wherein the second image processor includes:

an input buffer configured to receive the left-eye and right-eye image data;

a first scaler configured to scale the left-eye image data to the second resolution;

a second scaler configured to scale the right-eye image data to the second resolution;

a correction module configured to correct the scaled left-eye image data and the scaled right-eye image data based on the pre-stored correction parameter and the sensed user's position information; and an output buffer configured to store the corrected left-eye image data and the corrected right-eye image data.

11. The stereoscopic image display device of claim 2, wherein the timing controller is on a control printed circuit board (CPCB), and the image processor is on a PCB separate from the CPCB.

* * * * *